UNITED STATES PATENT OFFICE.

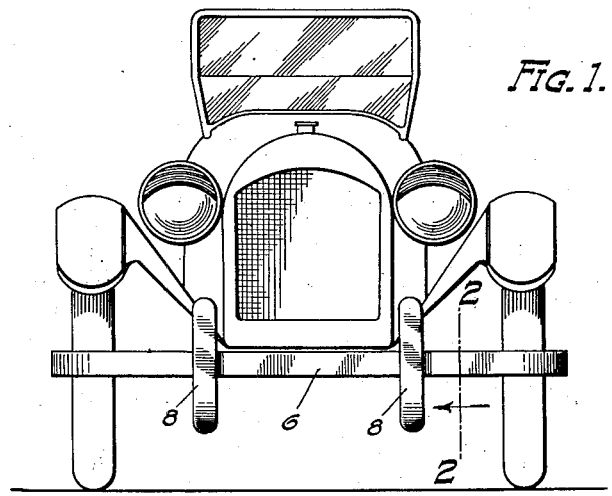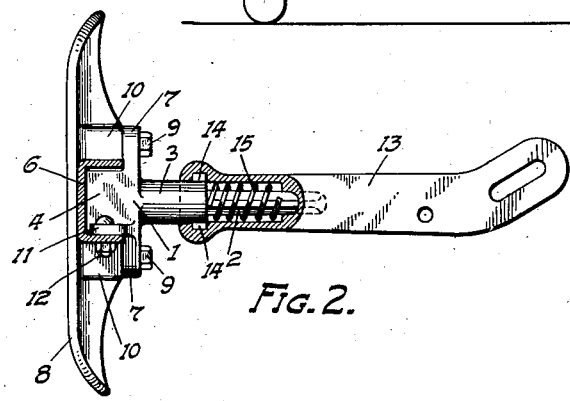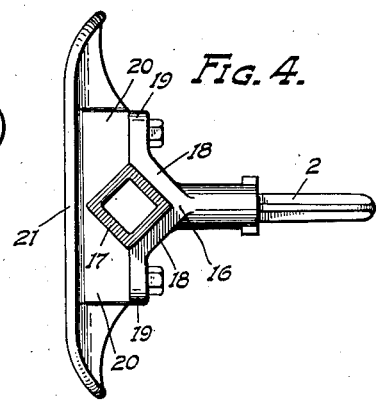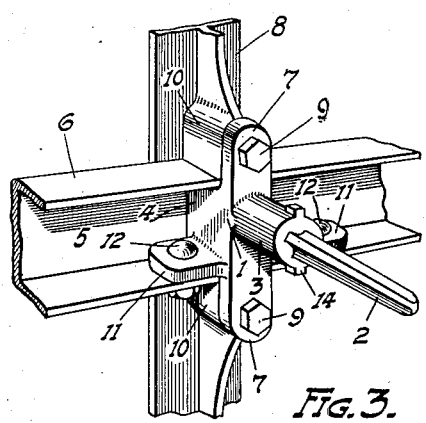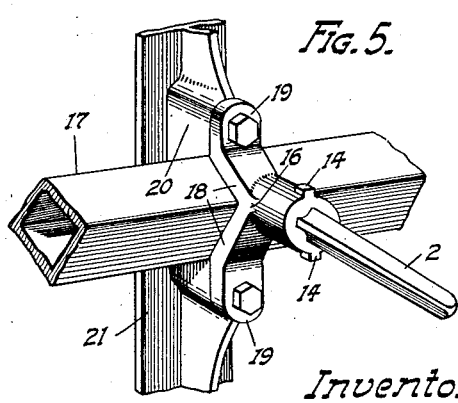

HARRY L. FRENCH, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE BUMPER.

1,404,517. Specification of Letters Patent. Patented Jan. 24, 1922.

Application filed March 7, 1921. Serial No. 450,255.

*To all whom it may concern:*

Be it known that I, HARRY L. FRENCH, a citizen of the United States, residing at Milwaukee, in the county of Milwaukee and State of Wisconsin, have invented new and useful Improvements in Automobile Bumpers, of which the following is a specification.

This invention relates to an automobile bumper.

The automobile bumper to which the invention particularly applies, comprises in general horizontally and vertically disposed bumper bars.

An object of the invention is to rigidly fasten the horizontal and vertical bumper bars together and to a supporting bracket by simple efficient fastening means of few parts which may be economically manufactured and readily applied thereto.

Other objects and advantages will hereinafter appear.

The views of the drawings are:

Fig. 1 is a front elevation of a bumper having a horizontal bar and two spaced vertically disposed bars attached thereto.

Fig. 2 is a side elevation of the attacher on line 2—2 of Fig. 1.

Fig. 3 is a perspective of the attacher clamped to a channel-shaped bumper bar and Figs. 4 and 5 show the attacher clamped to a tubular bumper bar.

Figs. 1 to 3 will be described first.

The attacher comprises, in general, a jaw 1, adapted to be fastened to bumper bars and an extension 2 for insertion in the sleeve of a bumper bracket, the jaw and extension being connected by and formed integral with a post or connector 3. The extension 2 and post 3 form the plunger of the bumper bracket which fits and works within the sleeve thereof.

The jaw 1 is provided with a block or wedge 4 which abuts the web 5 of a horizontal bumper bar 6, and two oppositely extending lugs 7, 7 for attachment to a vertical bumper bar 8.

The vertical bar 8 and jaw 1 are rigidly fastened together, with the horizontal bar 6 clamped therebetween, by bolts 9 extending through apertures in the lugs 7, 7 and screwed into a web 10.

The jaw 1 may be provided with horizontally extending ears 11, 11 bearing upon the lower flange of the horizontal bumper bar and fastened thereto by bolts 12.

The extension 2 is adapted to be inserted in one end of a bumper bracket 13. Slots are provided in the outer end of the bracket to receive lugs 14, 14 formed on the periphery and near the end of the connector 3. After the extension is fully inserted in the end of the bracket, the bracket may be turned slightly to move the slots away from the lugs 14, 14 and lock the attacher firmly in the bracket. A spring 15 surrounding the extension 2 within the bracket 13 abuts the end of the connector 3, thereby forming a resilient connection therebetween and preventing the contacting parts from rattling.

The bracket 13 may be attached to the side bar of an automobile chassis by hook bolts or other means.

The attacher shown in Figs. 4 and 5 is similar to the attacher described above, except the jaw 16 is adapted to be clamped to a tubular bumper bar 17. The jaw 16 has two flanges 18, 18 which engage adjacent sides of the tubular bar and two lugs 19, 19 having apertures therein for bolting the jaw of the attacher to the web 20 of a vertical bumper bar 21.

The attacher may, of course, assume other shapes and forms depending upon the shape of the bumpers and bumper brackets to be connected thereby.

Furthermore, the attacher and bracket may consist of a single piece of material and may be connected directly to the side bar flange of an automobile.

A vertical bumper guard and clamping jaw therefor is disclosed in co-pending application Serial No. 437,472, filed January 15, 1921, but no means are disclosed therein for attaching the bumper or clamping jaw therefor directly to the bumper bracket or side bar flange of an automobile.

Obviously other embodiments and adaptations may be made of the invention contained herein.

The invention claimed is:

1. In combination, a horizontal bumper bar, a vertical bumper bar extending above and below said horizontal bar, and means holding said vertical bar in engagement with said horizontal bar, said means having an extension formed integral therewith for attachment to a bumper bracket.

2. An automobile bumper comprising a main horizontal impact bar, an auxiliary vertical impact bar, and a bumper-supporting bracket fastened to both the main and auxiliary impact bars.

3. An automobile bumper comprising a main horizontal impact bar, an auxiliary vertical impact bar, and a bumper-supporting bracket fastened to the auxiliary impact bar and cooperating therewith to clamp the main impact bar therebetween.

4. An automobile bumper comprising a transverse impact bar, a bracket for supporting the transverse impact bar and having at one end a jaw, and an auxiliary impact bar provided with a jaw cooperating with the bracket jaw to grip and clamp the transverse impact bar therebetween.

5. In combination, a pair of jaws adapted to be clamped to a horizontal bumper bar, one of said jaws having a bumper shoe formed integral therewith, and the other of said jaws having means for engaging a bumper bracket.

6. In combination, a plurality of bumper bars, one arranged in a horizontal plane and another arranged in a vertical plane, and means for holding said bars in engagement with one another, said means having an extension integral therewith for attachment to a supporting bracket.

7. In an automobile bumper having a transverse impact bar and a supporting bracket therefor, the combination of an auxiliary impact bar, a jaw for the supporting bracket, a jaw for the auxiliary impact bar, and means for causing said jaws to grip and clamp the transverse impact bar therebetween.

8. In an automobile bumper having a transverse impact bar and a supporting bracket therefor, the combination of an auxiliary impact bar so positioned with respect to the main transverse impact bar as to increase the impact area of the bumper, a jaw for the supporting bracket, and a jaw for the auxiliary impact bar cooperating with the bracket jaw to grip and clamp the transverse impact bar therebetween.

9. An automobile bumper comprising a transverse impact bar, a supporting bracket therefor, a jaw for the bracket, an auxiliary impact bar, and means cooperating with the bracket jaw and the auxiliary impact bar for causing the same to grip and clamp the transverse impact bar therebetween.

In witness whereof, I have hereunto subscribed my name.

HARRY L. FRENCH.